June 4, 1929. A. KÖNIG 1,715,845

TACHEOMETRIC TELESCOPE

Filed July 15, 1927

Inventor:
Albert König

Patented June 4, 1929.

1,715,845

UNITED STATES PATENT OFFICE.

ALBERT KÖNIG, OF JENA, GERMANY, ASSIGNOR TO THE FIRM CARL ZEISS, OF JENA, GERMANY.

TACHEOMETRIC TELESCOPE.

Application filed July 15, 1927, Serial No. 206,108, and in Germany July 26, 1926.

The present invention relates to a terrestrial telescope which is constructed as a double-image telemeter for measuring the distance of a stadia. In order that in a terrestrial telescope of such construction the double-images produced appear separated from each other by a sharp line and that, in addition, the adjustment is guaranteed to remain unaltered, the above telescope is according to the invention arranged in the following way. Provision is made for a double wedge of such a position and construction that the edge formed by the two wedge-surfaces intersects the optical axis of the telescope and lies in the objective-image plane of the telescope and that the two images of the entrance pupil, produced at the locus of an image plane of the entrance pupil of the telescope, are displaced relatively to each other by approximately half their diameter. Furthermore there is provided adjacent to the objective of the telescope an optical deflecting device, which deflects at least those rays, entering the one of the two halves into which the objective is divided by the plane, determined by the optical axis of the telescope and the said edge, parallel to the latter. Finally, there is disposed at the locus of an image plane of the entrance pupil of the telescope (suitably at the locus of the image plane of the entrance pupil, lying between the collective lens and the ocular of the telescope) a diaphragm whose free aperture, perpendicular to the said edge, is approximately equal to half the diameter of the images of the entrance pupil, produced at this locus. Although a smaller extension of the free aperture in the aforesaid direction would be in itself admissible, it would not be suitable on account of the reduction of the luminosity resulting therefrom.

In the simplest case the said optical deflecting device may consist of a wedge which appertains to the one of the said two halves of the objective.

Figure 1:
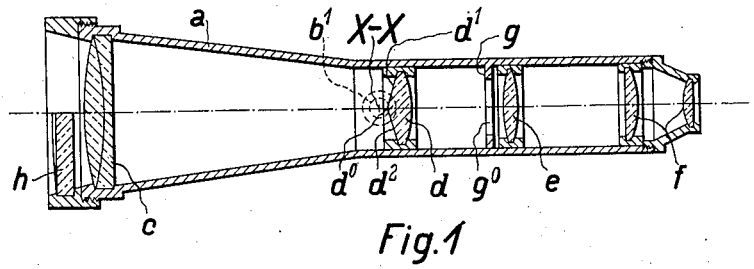
Figure 2:
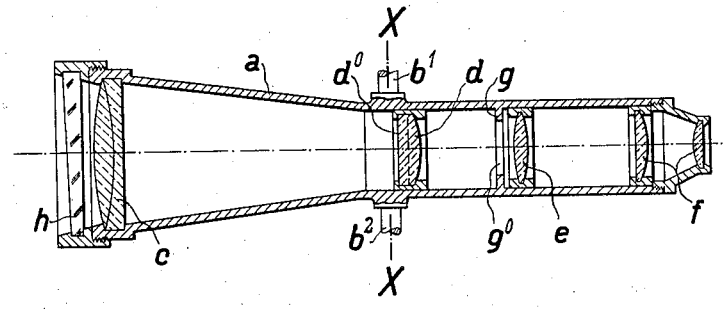
Figure 3:
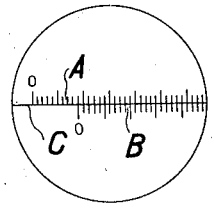

Figs. 1 and 2 of the annexed drawing are longitudinal sections of a terrestrial telescope according to the present invention in an elevation and a plan. Fig. 3 illustrates the stadia upon which the distance-measuring is based, as seen in the telescope.

The telescope whose casing is denoted by $a$ is assumed to be disposed rotatable about a horizontal axis X—X by means of two pivots $b^1$ and $b^2$ in a bearing (for simplicity not shown in the drawing). The telescope contains an objective $c$, a collective lens $d$, a reversing lens $e$ and an ocular $f$. The side of the collective lens $d$, facing the objective $c$, is provided with two plane surfaces $d^1$ and $d^2$ whose intersecting line $d^0$ lies in the objective-image plane of the telescope and is at the same time parallel to the axis X—X. The line $d^0$ intersects the optical axis of the telescope, and the surfaces $d^1$ and $d^2$ lie symmetrical with respect to the plane determined by the line $d^0$ and the optical axis of the telescope. The surfaces $d^1$ and $d^2$ are inclined to the said plane in such a way that the two images of the entrance pupil, produced at the locus of the image plane adjacent to the reversing lens, of the entrance pupil of the telescope, are displaced relatively to each other by half their diameter. In this image plane is disposed a diaphragm $g$ whose free aperture $g^0$ has a diameter, which is equal to half the diameter of these images of the entrance pupil. In front of the lower of the two halves of the objective $c$, determined by the said plane, is disposed a wedge $h$ in such a way that it deflects the rays, entering this lower half, parallel to the intersecting line $d^0$ of the two wedge-surfaces $d^1$ and $d^2$ of the collective lens $d$.

Fig. 3 shows the effect of this deflection which differs according to the distance of the stadia. To the observer there are presented two images A and B of the stadia, which are separated from each other by a sharp boundary line C. The product of the distance apart at any one time between the zero lines of the two images and a constant proper to the telescope yields the distance of the stadia.

I claim:

1. In a tacheometric telescope an objective, a collective lens lying behind the objective, a reversing lens system lying behind the said collective lens, an ocular lens system lying behind the said reversing system, a double wedge, the edge of which lies in the focal plane of the objective and perpendicularly intersects the objective axis, the double wedge and the said collective system being adapted to form together a pair of images of the objective approximately at the locus of the reversing system, displaced relatively to each other by approximately half their diameter and the ocular system being adapted to form a real image of the said pair of images behind the ocular, a deflecting device disposed adjacent to the objective and adapted to deflect in the direction parallel to the said edge at least half the rays entering the objective, and a diaphragm disposed at the locus of one of the said pairs of images of the objective, the diameter of the said diaphragm, lying perpendicular to the said edge, being approximately equal to the relative displacement of the pair of images lying at this locus.

2. In a tacheometric telescope an objective, a collective lens lying behind the objective and being provided at one of its surfaces with two wedge surfaces, intersecting each other in an edge which lies in the focal plane of the objective and perpendicularly intersects the objective axis, a reversing lens system lying behind the said collective lens, an ocular lens system lying behind the said reversing system, the said double wedged collective lens being adapted to form a pair of images of the objective approximately at the locus of the reversing system, displaced relatively to each other by approximately half their diameter and the ocular system being adapted to form a real image of the said pair of images behind the ocular, a deflecting device disposed adjacent to the objective and adapted to deflect in the direction parallel to the said edge at least half the rays entering the objective, and a diaphragm disposed at the locus of one of the said pairs of images of the objective, the diameter of the said diaphragm, lying perpendicularly to the said edge, being approximately equal to the relative displacement of the pair of images lying at this locus.

3. In a tacheometric telescope an objective, a collective lens lying behind the objective, a reversing lens system lying behind the said collective lens, an ocular lens system lying behind the said reversing system, a double wedge, the edge of which lies in the focal plane of the objective and perpendicularly intersects the objective axis, the double wedge and the said collective system being adapted to form together a pair of images of the objective approximately at the locus of the reversing system, displaced relatively to each other by approximately half their diameter and the ocular system being adapted to form a real image of the said pair of images behind the ocular, a deflecting device disposed adjacent to the objective and adapted to deflect in the direction parallel to the said edge at least half the rays entering the objective, and a circular diaphragm, disposed at the locus of one of the said pairs of images of the objective, the diameter of the said diaphragm being approximately equal to the relative displacement of the pair of images lying at this locus.

4. In a tacheometric telescope an objective, a collective lens lying behind the objective, a reversing lens system lying behind the said collective lens, an ocular lens system lying behind the said reversing system, a double wedge, the edge of which lies in the focal plane of the objective and perpendicularly intersects the objective axis, the double wedge and the said collective system being adapted to form together a pair of images of the objective approximately at the locus of the reversing system, displaced relatively to each other by approximately half their diameter and the ocular system being adapted to form a real image of the said pair of images behind the ocular, a wedge disposed adjacent to the objective and covering one half of the objective, the principal section of this wedge lying parallel to the said edge, and a diaphragm disposed at the locus of one of the said pairs of images of the objective, the diameter of the said diaphragm, lying perpendicularly to the said edge, being approximately equal to the relative displacement of the pair of images lying at this locus.

ALBERT KÖNIG.